US006067551A

United States Patent [19]

Brown et al.

[11] Patent Number: 6,067,551

[45] Date of Patent: May 23, 2000

[54] COMPUTER IMPLEMENTED METHOD FOR SIMULTANEOUS MULTI-USER EDITING OF A DOCUMENT

[75] Inventors: Kevin Lane Brown, Carnation; Mark John Walker, Redmond, both of Wash.

[73] Assignee: Microsoft Corporation, Redmond, Wash.

[21] Appl. No.: 08/971,076

[22] Filed: Nov. 14, 1997

[51] Int. Cl.[7] ...................... G06F 17/30

[52] U.S. Cl. ...................... 707/203; 707/10; 707/511; 345/331

[58] Field of Search ...................... 707/511, 203, 707/8, 530, 10; 709/205, 102; 711/152, 206; 345/329, 331; 380/49

[56] References Cited

U.S. PATENT DOCUMENTS

| | | | |
|---|---|---|---|
| 5,008,853 | 4/1991 | Bly et al. | 345/331 |
| 5,216,604 | 6/1993 | Sakata | 707/530 |
| 5,220,657 | 6/1993 | Bly et al. | 711/152 |
| 5,408,470 | 4/1995 | Rothrock et al. | 370/62 |
| 5,642,503 | 6/1997 | Reiter | 707/8 |
| 5,644,768 | 7/1997 | Periwal et al. | 709/102 |
| 5,671,428 | 9/1997 | Muranaga et al. | 345/329 |
| 5,758,358 | 5/1998 | Ebbo | 707/203 |
| 5,781,732 | 7/1998 | Adams | 709/205 |
| 5,835,601 | 11/1998 | Shimbo et al. | 380/49 |
| 5,845,293 | 12/1998 | Veghte et al. | 707/202 |
| 5,890,177 | 3/1999 | Moody et al. | 707/511 |
| 5,956,754 | 9/1999 | Kimmel | 711/206 |

*Primary Examiner*—Hosain T. Alam
*Assistant Examiner*—Ella Colbert
*Attorney, Agent, or Firm*—Jones & Askew, LLP

[57] ABSTRACT

Word processing program module having a multi-user editing capability provided for by the utilization of a multi-user control file (MCF) that is created when a document is first accessed. The MCF is comprised of individual record files for the master copy of the document, and each user and includes an assigned name, a date/time number, and a version identifier number. The MCF facilitates the tracking of the version identifier numbers to control the timing and sequence of events when a user opens, saves, and/or closes a document. The MCF also facilitates the control of the reconciliation of documents that may be required when a user attempts to save as well as facilitates the performing of the necessary timing functions when conflict resolving is required before edits are saved. The MCF further facilitates the capability to automatically recover the multi-user editing environment from a system failure as well as to manually remove a user from the multi-user editing environment.

24 Claims, 13 Drawing Sheets

COMPUTER IMPLEMENTED METHOD FOR SIMULTANEOUS MULTI-USER EDITING OF A DOCUMENT

TECHNICAL FIELD

This invention relates to a system and method for version tracking, timing, editing, and conflict resolution during simultaneous, multi-user editing of a document saved on a disk.

BACKGROUND OF THE INVENTION

In distributed network environments (including peer-to-peer networks where users share access to each others hard drives, as well as file server networks having a plurality of remote computers coupled to a central file server), users often create documents that are saved to a shared server. Each user on the network may then have access to a copy (the "master copy") of each document for the purposes of editing the copy saved on the shared server. Word processing programs currently available in the industry all perform their functions by working off of a disk. In the network environment based on a shared file server, the master copy is accessed from the file server disk and repeatedly saved backed to the file server disk as each user in turn makes edits to the document. Currently, only one user can access the master copy from the file server at a time and save back over the master copy to thereby update the old version of the master copy. If any other user attempts to access the document from the file server disk while another user is using the master copy, the second user will be denied access and will be informed that the master copy is "currently in use".

Some word processing programs attempt to bypass this "currently in use" situation by creating an alias and having the subsequent user view a copy of the master copy. The user is then informed that the master copy is currently in use and that the document is read only. Therefore, the user must save the alias copy of the master copy under a different name if any edits are made and saved.

Because simultaneous, multi-user editing is not currently possible, there will not be a single master copy of the document that reflects all the edits made by the users that may have accessed the master copy of the document. Thus, there will not be a single reconciled version of the master copy that reflects all the edits.

Consequently, there is a need for a system and method for simultaneous, multi-user editing of the master copy of a document available over a network from a file server to a number of users. That need is especially keen when dealing with distributed network systems where a number of users need to regularly access common documents from a file server disk. Without simultaneous, multi-user editing capability, users will have to wait to gain access to the document while others complete their use of the document.

There is also a need for a system and method for reconciling various edited versions of the master copy of a document that is simultaneously edited by a number of users in a network system. In addressing the simultaneous, multi-user editing capability, problems arise with the sequencing and timing of the various saving actions by the plurality of users. There will be many situations where several users will attempt to save at the same time. This creates a timing problem and, thus, there is a need for providing for the specific control and regulation of the sequential saving by the plurality of users. In addition, the timing and control needs to take into consideration the reconciliation activity that may be required as users save their edited versions.

Other problems exist, when addressing simultaneous, multi-user editing capabilities, such as the recognition of conflicts. Conflicts may arise during the reconciling process, for example, where several users may be attempting to simultaneously edit the same area of the document. These types of conflicts must be resolved before allowing the user to save his edits. Thus, there is a need for a system and method to detect conflict situations and facilitate the resolution of such conflicts before the user saves his edits.

In providing a system and method for simultaneous, multi-user editing in a network environment, problems may arise when a user finishes editing a document and suspends work without closing the document. Therefore, there is a further need to provide for the manual removal of users from a simultaneous, multi-user editing system when such users have suspended editing the document without closing the document. For an efficient simultaneous, multi-user editing system, the inactive user can be removed by other users when the inactive user inadvertently fails to close the document when he or she suspends editing. In addition, there is a need for a simultaneous, multi-user editing system that provides for the automatic recovery from a system failure where all the active users will be reconnected as the system starts back up, and the system will be reconfigured to the state that existed before the system failure occurred.

In general, the need for simultaneous, multi-user editing systems is needed in networked systems where multi-user sharing capabilities are provided in peer-to-peer systems where users share access to each others hard drives, as well as in file server networks having a plurality of remote computers coupled to the file server. However, the systems currently available today in the industry do not provide for the simultaneous, multi-user editing capabilities in such network environments.

Therefore, in the context of word processing within a network environment, there is a long felt need for a word processing program that provides for the simultaneous, multi-user editing capabilities. Additionally, there is a need to control the timing and sequential order of the various saving actions from the plurality of users while also providing for the detection and resolution of conflicts during reconciliation of the edits from various users. Further, there is a need to provide for the automatic recovery from a system failure as well as the need to provide for the manual removal of users from the system.

SUMMARY OF THE PRESENT INVENTION

The present invention satisfies the above-described needs by providing a system and method for simultaneous, multi-user editing of a document that is saved on a shared disk on a network. In one aspect of the present invention, the system and method of the present invention create a multi-user control file (MCF) that acts as sort of a traffic cop to perform the tracking functions of all the various versions of the master copy of the document that are being edited by the plurality of users. Through tracking the various versions of the document, the MCF coordinates the synchronization of the various versions of the document during the reconciliation process that is performed when a local copy of the document is being saved and is not yet up to date with the master copy of the document on the shared server. In addition, the multi-user control file controls timing issues related to the reconciliation procedure, conflict resolution, and the sequential order of events which take place during the various saving actions by the plurality of users.

More particularly, the timing issues are handled by the MCF in that the MCF is set to a locked mode during a reconciliation wherein no other users can access the master copy of the document and save changes to it. After the reconciliation procedure is completed, or if conflicts are found, the MCF is set back to the unlocked mode wherein it is free for all users to access the master copy of the document and save edits.

Along with the reconciliation procedure, the present invention further provides a system and method for the detection of conflicts during the reconciliation process and for the resolution of such conflicts after detection. More particularly, in resolving the conflicts, the present invention displays a Conflict Dialog Box to the user whereby all the conflicts are presented and the user is requested to either “accept” or “reject” each of the conflicting edits.

Further, the present invention provides a system and method for the manual removal of users from the MCF to allow for the handling of situations where a user finishes editing a document and leaves without closing the document. If the document is not closed by one of the users, the MCF will remain on the shared server waiting for the user to close the document. In addition to the manual removal of users, the present invention provides for the automatic recovery of the system should a system failure occur. The MCF, in this instance, will operate to reconstruct itself on the shared server from the files located on the remote computers of the users. Once the MCF is reconstructed, a synchronization process takes place, including reconciliation if needed, to update all local copies of the document with the master copy of the document and resume the multi-user editing functionality.

In another aspect of the present invention, a networked computer system is provided in which remote users can simultaneously access and edit a master copy of a document that is stored in memory on a shared server. The system typically has a shared file server having a processing unit (PU), a memory storage device coupled to the PU, a network bus coupled to the PU, at least one remote computer having a processor coupled to the network bus, an input device coupled to the processor, such as a keyboard or a mouse, a pixel-based display device coupled to the processor, and a remote memory storage device coupled to the processor. In some applications, however, the shared server does not include a PU. The absence of a PU in the shared server does not affect the overall operation of the present invention in that primarily all the processing is performed locally by the local users’ processors. In this networked computer system, a master copy of a document is stored in the memory storage device of the shared server. The processor of the remote computer is operative to create a multi-user control file associated with the master copy of the document when the master copy is first accessed by a user. The processor at the same time creates a local copy of the document for the remote user and assigns the master copy of the document and the local copy of the document version identifier numbers. The processor of each remote computer then accesses the MCF on the shared server. The MCF tracks the version identifiers of the various documents and controls the timing of access to the master copy when each respective local user attempts to save edits.

The processor of the remote computer is also operative to create record files for each user. The record file of each user accesses the master copy of the document and assigns a name and a date/time number for each user, updates the version identifiers as edits are saved, and groups together the information for each user for easy tracking by the MCF. The processor of each remote computer is also operative to reconcile the master copy of the document with the local copy of the document of the user as well as detect and provide for the resolution of conflicts that may arise during the reconciliation procedure. The processor of the remote computer is further operative to automatically recover from system failure as well as to facilitate the manual removal of a user.

In yet another aspect of the present invention, a computer-readable medium is described on which is stored a computer program for implementing simultaneous, multi-user editing of the master copy of a document stored in memory of a shared server. The computer program instructions, when executed, create a multi-user control file on the shared server which is associated with the master copy of the document when the master copy is first accessed by a remote user. The computer program also creates a duplicate local copy of the document for each remote user. Thereafter, the multi-user control file assigns the master copy of the document and the local copies of the document a version identifier number. Once the version identifiers are assigned, the multi-user control file tracks the version identifiers of the local copies of the document in order to control the timing of the various saving actions of the users as edits are saved. The end result of executing the program instructions is the maintenance of an updated master copy of the document that reflects the latest edits saved by the plurality of users as the users simultaneously access and edit the master copy of the document.

More particularly, in executing the program instructions, the control of the various versions of the document being saved by the plurality of users further includes the reconciling of the versions with each other as well as the detecting of conflicts during the reconciling process and the subsequent resolving of the conflicts before the user’s edits are finally saved.

Further, the program instructions, when executed, create record files on the shared server for each user, provide for the automatic recovery of the multi-user editing capability from a system failure as well as provide for the manual removal of a user from the multi-user editing environment.

These and other advantages of the present invention will be appreciated from studying the following detailed description and drawings, and the appended claims.

BRIEF DESCRIPTION OF THE DRAWINGS

FIG. 2, consisting of FIGS. 2A–2G, are flow diagrams illustrating steps of the embodiment for:

DETAILED DESCRIPTION

Figure 1:
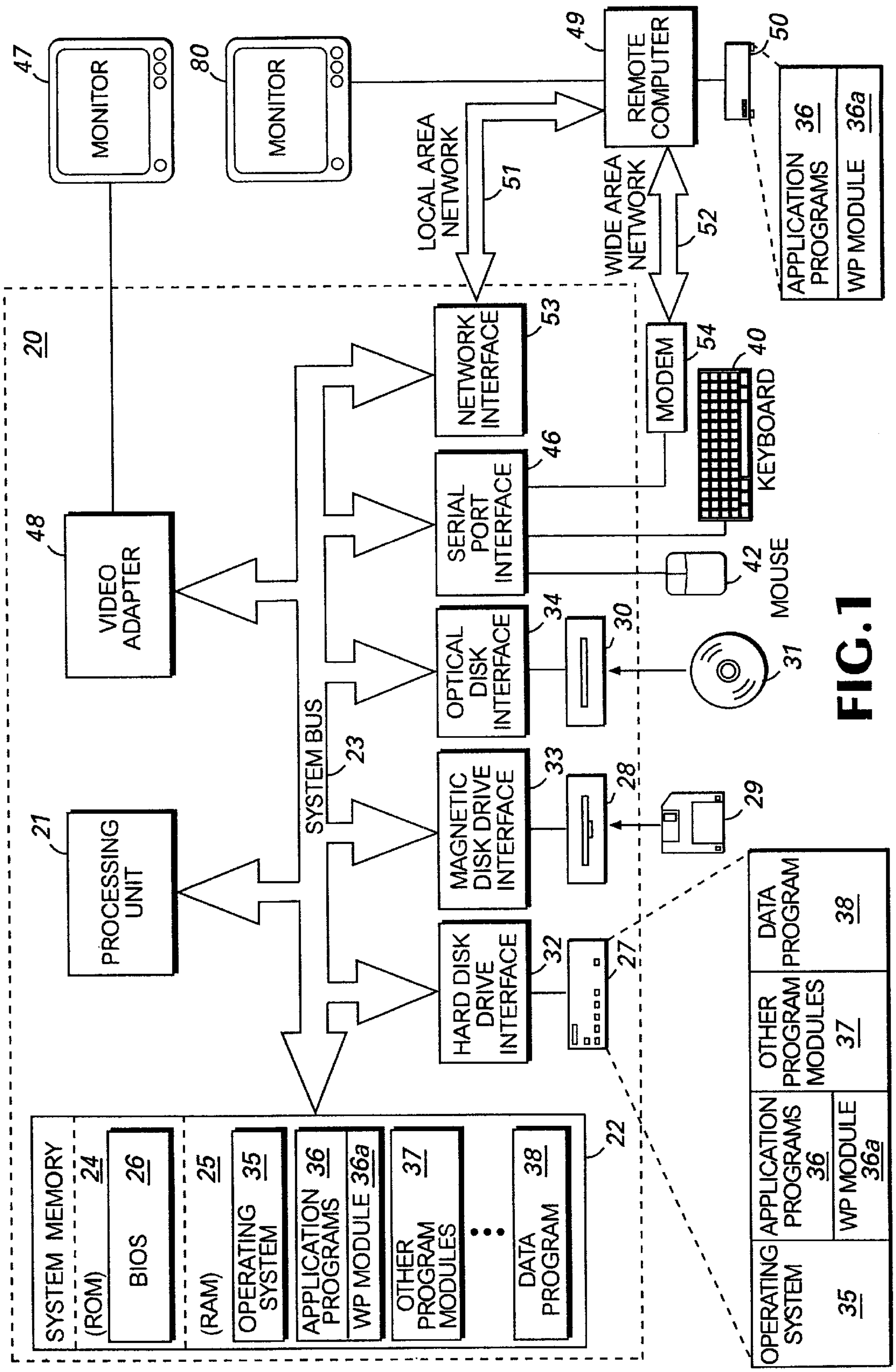
FIG. 1 is a block diagram of a computer system representing the operating environment of an embodiment of the present invention.

The present invention is directed to a system and method for providing simultaneous, multi-user editing of a document saved on a shared disk. An illustrative embodiment of the present invention is incorporated into the Microsoft Word 97 word processing program developed and marketed by Microsoft Corporation of Redmond, Wash.

The present invention, as illustrated by the Microsoft Word 97 word processing program, allows multiple users to simultaneously edit a document that is saved as a master copy on a shared disk. The present invention provides simultaneous multi-user editing of the master copy on the file server by monitoring and controlling user access to the master copy of the document and by monitoring and controlling the save operation of each of the plurality of users who have edited the document. The capability of simultaneous, multi-user editing is accomplished by means of a multi-user control file (MCF) that is created and stored on the shared disk along with the master copy of the document. The MCF monitors and controls the various versions of the document created by the plurality of users as a result of each user's editing to the document. In order to monitor and control the editing of the master copy of the document, the MCF assigns unique names to each individual remote user when each user accesses the document, controls the timing issues related to the requested saving commands by the multiple users, coordinating the overwriting of the master copy of the document located on the file server by comparing the user edited version of the document to be saved to the version of the master copy currently on the file server, and coordinates the resolution of conflicts arising during the reconciliation process when two or more users are attempting to save their edited versions that contain changes to the same area of the document.

First, a brief description of the general operation of a computer system will be discussed that is suitable for utilizing the present invention. Although the embodiment of the present invention will be generally described in the context of a word processing program module and an operating system running on a personal computer, those skilled in the art will recognize that the present invention can also be implemented in conjunction with other program modules for other types of documents and for other types of computers. Furthermore, those skilled in the art will recognize that the present invention is implemented in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks, enterprise-wide computer networks, and the global Internet.

In general, a program module may use an interprocess communication to communicate with another program module. An interprocess communication is the ability of a task or process to exchange data with another task or process. Examples of such interprocess communications readily recognized by those skilled in the art include the use of pipes, semaphores, and shared memory. In one embodiment of the present invention, a program module calling an application programming interface (API) to command another program module to perform a task, such as printing the contents of a section to a temporary file, is one such interprocess communication.

The detailed description which follows is represented largely in terms of processes and symbolic representations of operations by conventional computer components, including a processing unit (PU), memory storage devices, connected display devices, and input devices. Furthermore, these processes and operations may utilize conventional computer components in a heterogeneous distributed computing environment, including remote file servers and compute servers. Each of these conventional distributed computing components is accessible by the PU via a communication network. The processes and operations performed by the computer include the manipulation of signals by a processor and the maintenance of these signals within data packets and data structures resident in one or more media within memory storage devices.

Generally, a "data structure" is an organizational scheme applied to data or an object so that specific operations can be performed upon that data or modules of data so that specific relationships are established between organized parts of the data structure. A "data packet" is a type of data structure having one or more related fields, which are collectively defined as a unit of information transmitted from one device or program module to another. These data structures impose a physical organization upon the collection of data stored within a memory storage device and represent specific electrical or magnetic elements. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, characters, data, packets, nodes, numbers, points, records, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as issuing, sending, altering, adding, comparing, determining, disabling, displaying, dispatching, placing, reporting, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the present invention may be implemented when such computers are used in a distributed computing environment. While the invention will be described in the general context of an application program that runs on an operating system in conjunction with a personal computer, those skilled in the art will recognize that the invention may also be implemented in combination with other program modules. Generally, program modules include routines, programs, components (such as stacks or caches), data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processing unit (PU) 21. The personal computer 20, also commonly referred to as the file server 20, is described herein to be preferably functioning as a file server within the present invention. Preferably, the PU 21 is in the form of a 80486 or of the family of "PENTIUM" microprocessors manufactured by Intel Corporation of Santa Clara, Calif. However, it should be understood that the invention can be implemented on computers that utilize other types of microprocessors, such as the "MIPS" family of microprocessors from the Silicon Graphics Corporation, the "POWERPC" family of microprocessors from both the Motorola Corporation and the IBM Corporation, the "PRECISION ARCHITECTURE" family of microprocessors from the Hewlett-Packard Company, the "SPARC" family of microprocessors from the Sun Microsystems Corporation, or the "ALPHA" family of microprocessors from the Digital Equipment Corporation.

In describing the details of the personal computer 20 further, the internal make-up of the personal computer 20 includes a system memory 22, and a system bus 23 that couples the system memory 22 to the PU 21. The system memory 22 includes read only memory (ROM) 24 and random access memory (RAM) 25. A basic input/output system 26 (BIOS) is stored in ROM 24. Those skilled in the art will recognize that the BIOS 26 essentially contains the basic routines that help to transfer information between elements within the personal computer 20 during certain computer operations, such as during start-up. However, it should be appreciated that other types of computers may transfer information between elements within the computer without the use of a BIOS 26 and that the invention can readily be implemented in such computers without a BIOS 26. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

The magnetic disk drive 28 and the optical disk drive 30 are also referred to as removable media devices, each having ejection switches (not shown) typically located on their respective front panels. A user typically depresses a drive's ejection switch in order to indicate the user wants to eject media from within the drive. As one skilled in the art will appreciate, each of the removable media devices 28, 30 has an ejection mechanism (not shown) used to eject media 29, 31 from the device.

Although not shown in FIG. 1, the optical disk drive 30 may be a changer type of memory storage device capable of maintaining more than one optical disk 31. An example of such a changer type of memory storage device is a conventional "juke box" type of optical disk drive 30. As a conventional changer device, the optical disk drive 30 may support individual slot load and unload for each removable medium within the drive 30. Alternatively, the optical disk drive 30 may support a cartridge load mechanism where all of the removable media are inserted into a single cartridge before being placed within the drive 30.

Those skilled in the art will understand that program modules and data are provided to the personal computer 20 via one of the local or remote memory storage devices or computer-readable media, which may include the hard disk drive 27, magnetic disk drive 28, optical disk drive 30, RAM 25, ROM 24, the remote memory storage device 50, and digital tapes (not shown). In the preferred embodiment, these program modules include an operating system 35, one or more application program modules 36, other program modules 37, and a word processing program module 36*a* for implementing the present invention, and program data 38 used by the various program modules. In the preferred personal computer 20, the hard disk drive 27 and RAM 25 are used to store these program modules once they are installed. However, it is contemplated that program modules and data may also be stored on a remote memory storage device 50.

The operating system 35, in conjunction with the BIOS 26 and associated device drivers, provides the basic interface between the computer's hardware and software resources, the user, and program modules, such as the application program modules 36. A user may enter commands and information into the personal computer 20 through the use of a keyboard 40 and/or other various input or pointing devices, such as a mouse 42. Other types of pointing devices (not shown in FIG. 1) may include track balls, track pads, joysticks, data gloves, head trackers, and other devices that are suitable for positioning a cursor on a monitor 47. Other input related devices (not shown) may include a microphone, a game pad, a satellite dish, a scanner, or the like. These and other input related devices are often connected to the PU 21 through. a serial port interface 46, such as a game port or a universal serial bus (USB). The monitor 47 or other type of display device is also connected to the system bus 23 via an interface, such as a video adapter 48. In addition to the monitor 47, personal computers typically include other peripheral output devices (not shown), such as speakers and printers.

When the personal computer 20 is turned on or reset, the BIOS 26, which is stored in the ROM 24, instructs the PU 21 to load the operating system 35 from the hard disk drive 27 into the RAM 25. Once the operating system 36 is loaded into RAM 25, the PU 21 executes the operating system 35 and causes the visual elements associated with the user interface of the operating system 35 to be displayed on the monitor 47.

The personal computer 20, may operate in a networked environment, as is utilized in the present invention, using logical connections to one or more remote programmable devices, such as a remote computer 49. The remote computer 49 may be a server, a router, a peer device, or other common network node. In the preferred embodiment of the present invention, the remote computer 49 is utilized as a user network node wherein access is gained to the documents located in the system memory 22 and hard disk drive 27 of the server computer 20. Typically, the remote computer 49 includes many or all of the elements described above relative to the personal computer 20, although only a remote memory storage device 50 and a monitor 80 has been illustrated in FIG. 1 in connection with the remote computer 49. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local area network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the hard disk drive 27. It will be appreciated that the network connections shown are merely exemplary and that other means of establishing a communications link between the personal computer 20 and the remote computer 49 may be utilized.

Although other internal components of the personal computer 20 are not shown, those of ordinary skill in the art will appreciate that such components and the interconnection between them are well known. Accordingly, additional details concerning the internal construction of the personal computer 20 need not be disclosed in connection with the present invention.

As previously mentioned, an embodiment of the present invention is found in the word processing program module 36*a*, which is designed to operate in conjunction with Microsoft Corporation's "WINDOWS 95" or "WINDOWS NT" operating systems. However, it should be understood that the invention can be implemented for use with other operating systems including, but not limited to, Microsoft Corporation's "WINDOWS 3.1" operating system, IBM Corporation's "OS/2" operating system, and the operating system used in "MACINTOSH" computers manufactured by Apple Computer, Inc.

It should be appreciated that operating systems, such as the "WINDOWS 95" and "WINDOWS NT" operating systems, are quite complex and provide a wide variety of services that allow users and programs to utilize the resources available in the personal computer. Those skilled in the art will be familiar with operating systems and their various features. For more comprehensive information regarding the "WINDOWS 95" and "WINDOWS NT" operating systems and their interaction with programs, the reader may refer to any of a variety of publications, including the "Win32 Programmer's Reference" and "Advanced Windows", both published by Microsoft Press.

Likewise, those skilled in the art will appreciate that the preferred embodiment of the present invention provides a wide variety of features and functions in addition to those included in the brief description presented above.

Figure 3:
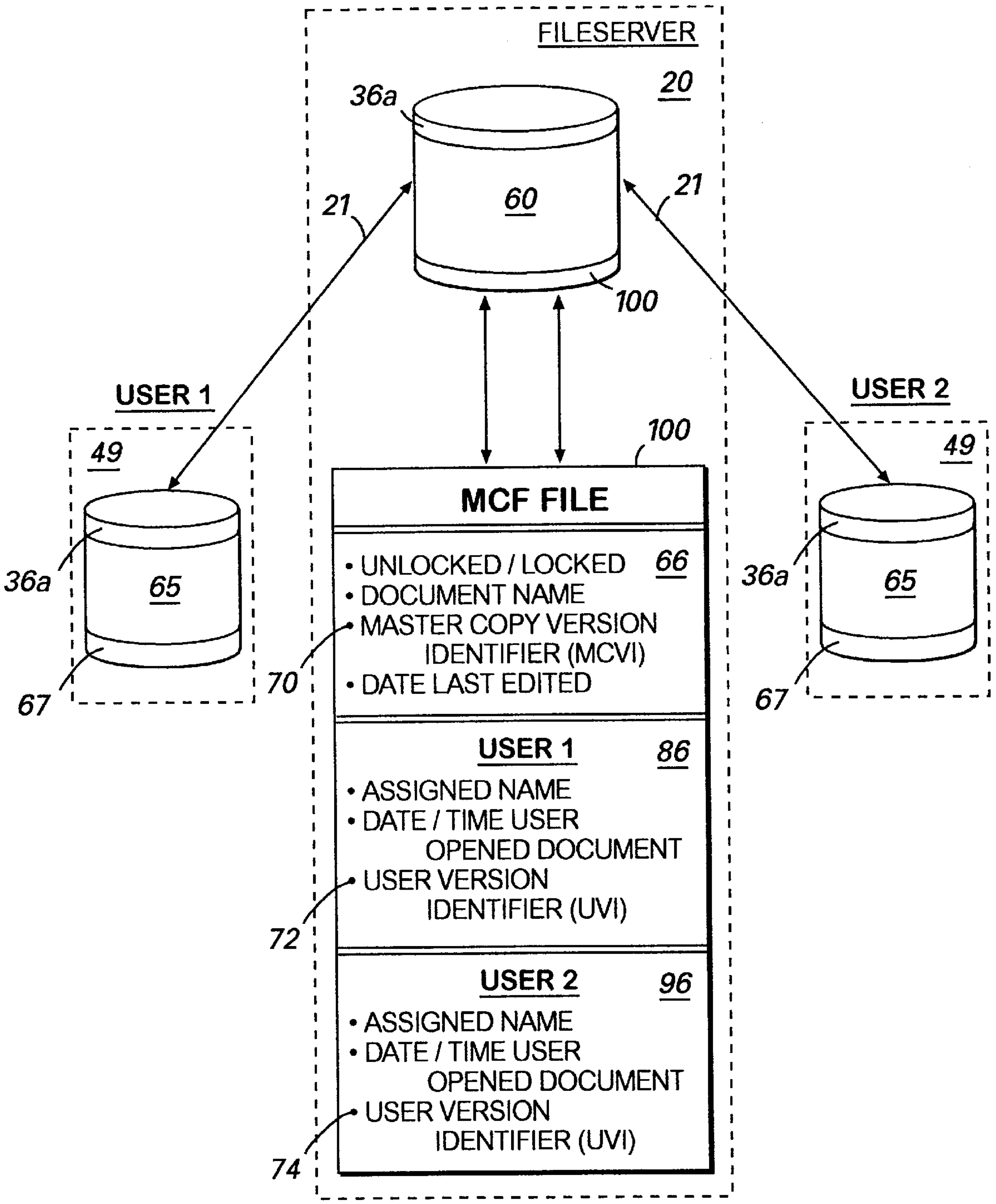
FIG. 3 is a block diagram illustrating the interaction between the shared file server, the remote computers of two users, and the MCF on the shared file server.

FIG. 3 shows a distributed computing environment in which the present invention operates. The distributed computing environment includes a shared file server 20 accessible over a network 21 by remote computers 49 of User 1 and User 2. The server 20 and each of the users, User 1 and User 2, have a copy of the word processing program 36a installed on their respective hard disks for implementing the present invention. Alternatively, the present invention could be implemented in a distributed computing environment where only the server 20 has a copy of the word processing program 36*a*. The following description will be based on the system as shown in FIG. 3, in which a master copy 60 of a word processor document is stored on the disk of the file server 20.

The Multi-User Program Module

Turning now to FIGS. 2A–2G and FIGS. 3–7, embodiments of the present invention are described. FIGS. 2A–2E are flow diagrams illustrating the steps of the embodiment for accomplishing simultaneous, multi-user editing of the master copy 60 of a document on a shared server 20 by connected User 1 and User 2. The various steps are illustrated showing the simultaneous, multi-user document editing method implemented by the word processing program 36*a*.

For single user editing of the master copy 60 of the document, the word processing program 36*a* for one of the remote users opens the master copy 60 of the document from the server 20, edits the master copy 60 of the document, and saves the edits by overwriting the master copy 60. For simultaneous, multiple users, such as remote User 1 and remote User 2, the word processing program 36*a* on the server 20 must have a mechanism for keeping track of the edits from each user before the edits of one user can be used to overwrite the master copy 60.

In order to monitor and control the updates to the master copy 60, the word processing program 36*a* on the remote computer 49 of the user creates a multi-user control file 100 (MCF) and saves it on the server 20. The operation of the MCF is illustrated in FIGS. 2A through 2G.

The Multi-User Control File and Initial Setup

Referring to FIGS. 2A–2E and FIG. 3, the preferred method 200 for the primary flow of the word processing program 36*a* begins at step 201 and proceeds to step 205. At step 205, User 1 accesses the word processing program 36*a* (WP) on his or her remote computer 49. Next, at step 210, the WP 36*a* on User 1's computer 49 displays a user interface screen on the monitor 80 (shown in FIG. 1) of the remote computer 49. At step 215 User 1's WP 36*a* opens the master copy 60 from the server 20 for viewing and/or editing as is needed by User 1. Once User 1 has selected the master copy 60 at step 215, User 1's WP 36*a* determines at step 220 whether an MCF 100 already exists for that specific selected master copy 60 of the document to be edited. If an MCF 100 (FIG. 3) already exists for the selected master copy 60, then, at step 225, the method of the present invention determines whether the MCF 100 is in the unlocked mode. If the MCF 100 is in the unlocked mode, then no other users (User 2 in this case) are currently saving to the master copy 60, the process follows the "yes" branch, and the user (User 1 in this case) is allowed to access the master copy 60 on the file server 20 as illustrated at step 230. If the MCF 100 is in the locked mode (User 2 is accessing the master copy 60 of the document for example), the method follows the "no" branch to step 235. At step 235, the WP 36*a* pauses for a specified amount of time to allow the MCF 100 to be set in the unlocked mode so that User 1 can access the master copy 60.

Figure 2A:
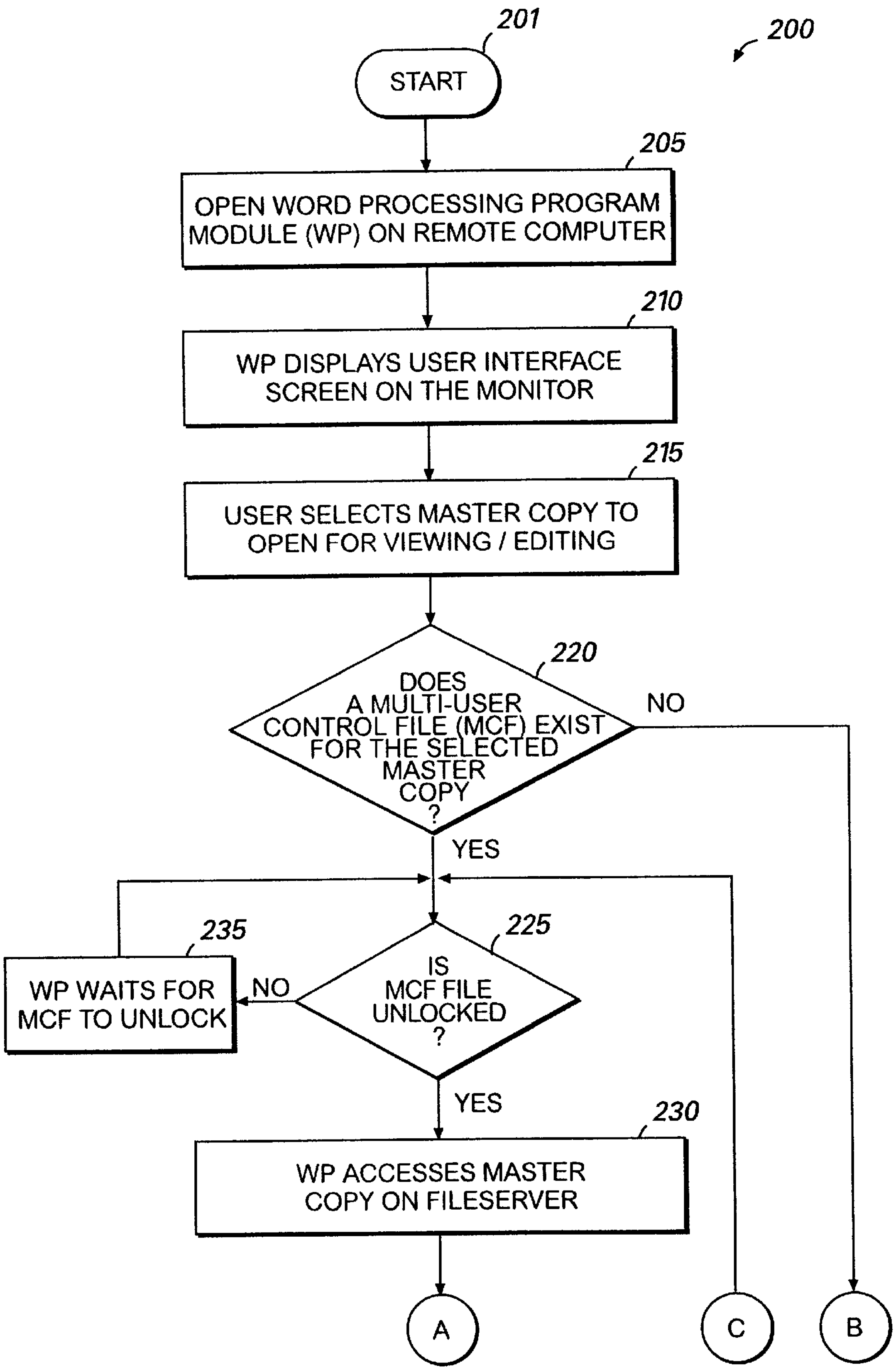
FIG. 2A, accessing the program module, opening the master copy of the document, and determining whether a multi-user control file (MCF) must be created.
Figure 2B:
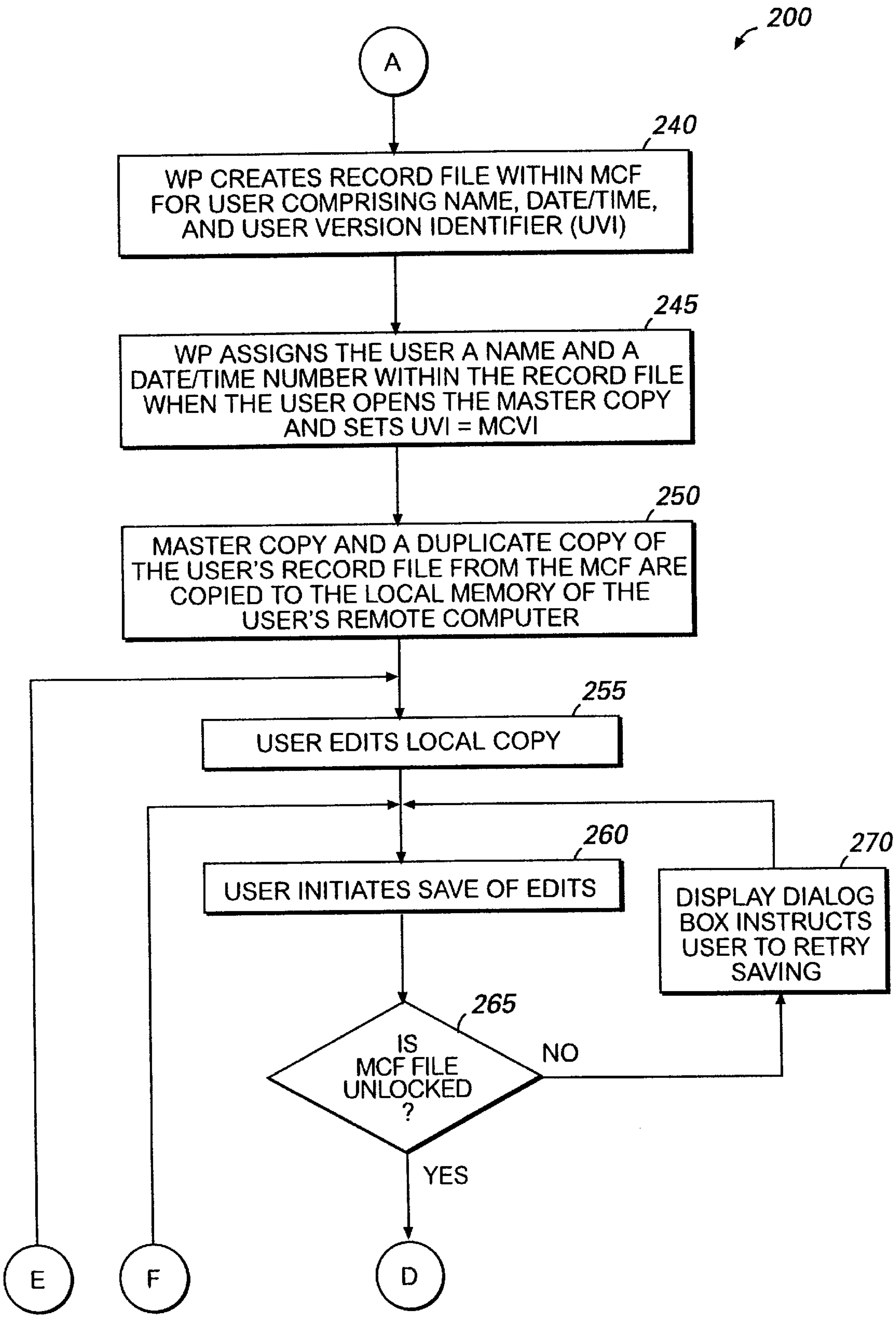
FIG. 2B, creating record files for each user, assigning variables to each user, copying the master copy of the document, copying the record file to the user’s resident memory, and initiating a save command by the user.
Figure 2C:
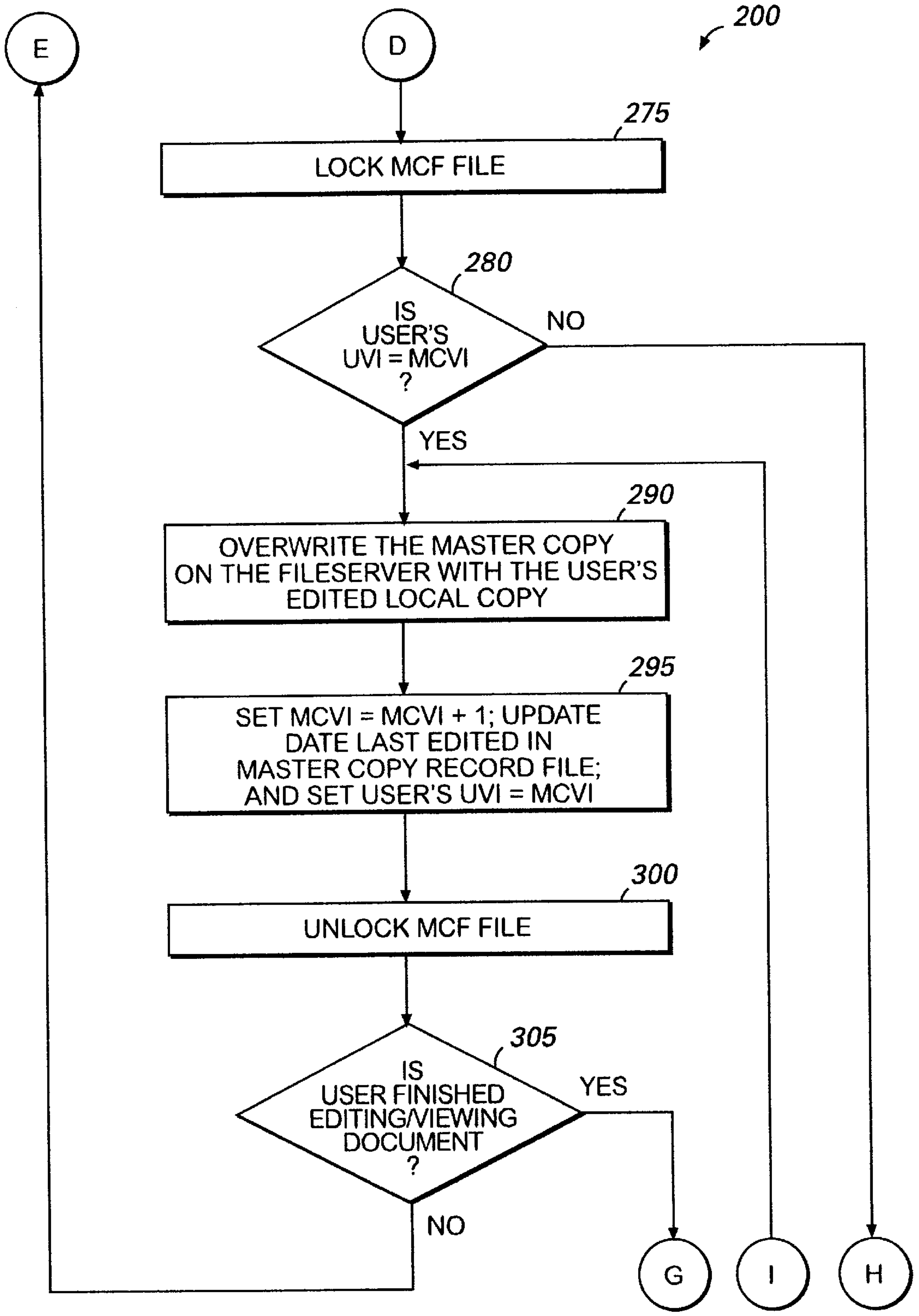
FIG. 2C, determining whether to reconcile the documents when the user attempts to save, saving edits to the master copy, and updating the user’s version identifiers.
Figure 2D:
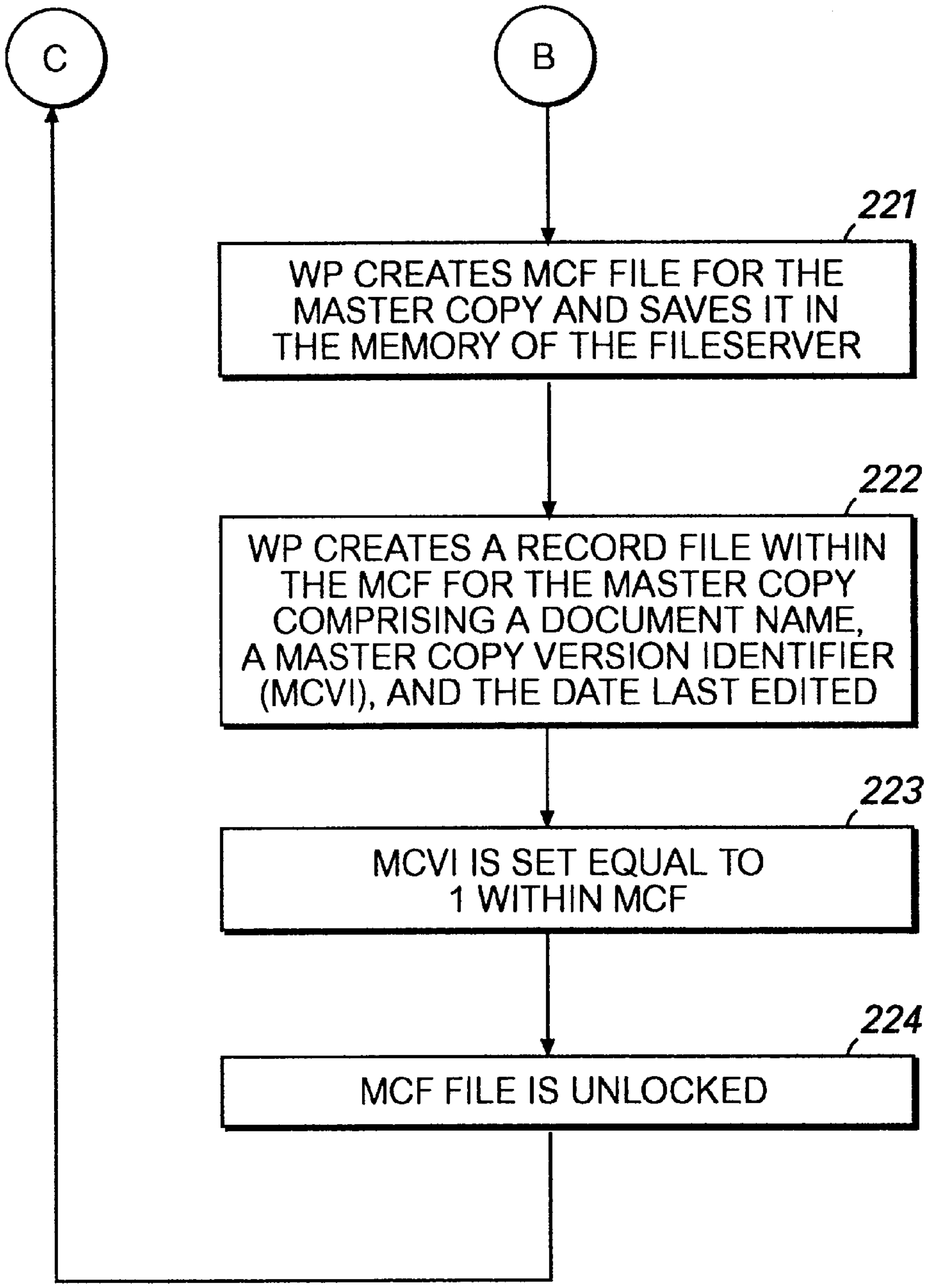
FIG. 2D, creating a MCF.

Referring to FIGS. 2A and 2D, the method for creating an MCF 100 when the user (User 1) is the first to access the specific master copy 60 begins at step 221 in FIG. 2D. At step 221, the WP 36*a* on User 1's computer 49 creates an MCF 100 for the master copy 60 and saves the MCF 100 in the resident system memory 22 of the file server 20. At step 222, the WP 36*a* on User 1's computer 49 creates a record file 66 (FIG. 3) within the MCF 100 for the master copy 60. The record file 66 for the master copy 60 includes an unlock/lock flag, a document name, a master copy version identifier 70 (MCVI), and the date last edited. After the MCF file 100 and the associated record file 66 for the master copy 60 are created, MCVI 70 is set equal to one (1) within the MCF 100 as shown at step 223. Finally, at step 224, the MCF 100 is set to the unlocked mode.

Once the MCF 100 has been created and the master copy version identifier 70 has been initialized, the method returns to step 225 as illustrated in FIG. 2A. From step 225, the method follows the "yes" branch to step 230 where the WP 36*a* of the remote computer 49 accesses the master copy 60 on the file server 20. With the MCF 100 in the unlocked mode and with the WP 36*a* having accessed the master copy 60 located on the file server 20, the method proceeds to step 240 in FIG. 2B. At step 240, the WP 36*a* creates a user record file 86 for User 1 within the MCF 100 that includes a name, a date/time number, and a user version identifier 72 (UVI). The name that is assigned to each user is a unique name that is readily recognizable within the MCF 100. The date/time number assigned to the user record file 86 for User 1 within the MCF 100 is in the form of one continuous number consisting of a series of digits representing the month, day, year, and time of day that User 1 initially accessed the master copy 60.

At step 245, the WP 36*a* completes the assignment of the name and the date/time number to the User, and completes the initialization of the UVI 72 by setting UVI 72 equal to MCVI 70. By setting UVI 72 equal to MCVI 70, indicates that User 1 has received the latest version of the master copy 60. Further, the version of the master copy 60 User 1 is working with when User 1 subsequently attempts to save edits to the master copy 60 is tracked within the MCF 100.

At step 250, the master copy 60 and a duplicate copy of the user record file 86 for User 1 are copied to the local resident memory of User 1's remote computer 49 to create a local copy 65 of the document and a local copy 67 of the user record file 86. At this point, User 1 is able to view and/or edit the local copy 65 of the master copy 60 as desired. The master copy 60 remains intact on the file server 20.

At step 255, User 1 edits the local copy 65. At step 260, User 1 saves the edits made to User 1's local copy 65. At step 265, the method determines whether the MCF 100 is unlocked. If the MCF 100 is locked at step 265, the method follows the "no" branch to step 270. At step 270, the WP 36*a* displays a dialog box to User 1 on the monitor of the remote computer 49 instructing User 1 to retry the saving request. User 1 tries to save the edits again at step 260. If, at step 265, the MCF 100 is unlocked, the method implemented by the WP 36*a* follows the "yes" branch to step 275 in FIG. 2C.

At step 275 in FIG. 2C, the save aspect of the method continues, and the MCF 100 is locked. When the MCF 100 is locked for the save operation by User 1, all other users, including User 2, are denied access to the MCF 100 while User 1 is saving. At step 280, User 1's UVI 72 and the current MCVI 70 on the server 20 are compared to determine whether a reconciliation procedure is required before User 1's edits may be saved to the master copy 60. If UVI 72 for User 1 is not equal to the current MCVI 70, the method follows the "no" branch from step 280, and a reconciliation procedure is required beginning at step 500 of FIG. 2F. If, however, UVI 72 is equal to the current MCVI 70, the master copy 60 has not been edited by another user between the time User 1 opened the document for editing and the time User 1 initiated a save, and the method follows the "yes" branch to step 290.

Once it is determined that UVI 72 for User 1 is equal to MCVI 70 at step 280, the master copy 60 on the file server 20 will be overwritten with the user's edited local copy 65 of the document as illustrated at step 290. Now that the master copy 60 has been updated by being overwritten at step 290, MCVI 72 is incremented by one at step 295. Also at step 295, the last edited date variable associated with the master copy 60 is updated, and UVI 72 is set equal to the new incremented MCVI 70. Once the version identifiers UVI 72 and MCVI 70 are updated, signifying that the attempted save was completed successfully, the MCF 100 is unlocked at step 300. At step 305, the method determines whether User 1 desires to continue editing and/or viewing the document. If User 1 is finished, the method follows the "yes" branch, and User 1 closes the master copy 60 at step 310 in FIG. 2E. Alternatively, if User 1 is not finished editing the document, the method follows the "no" branch to step 255, and the method continues as previously described.

Figure 2E:
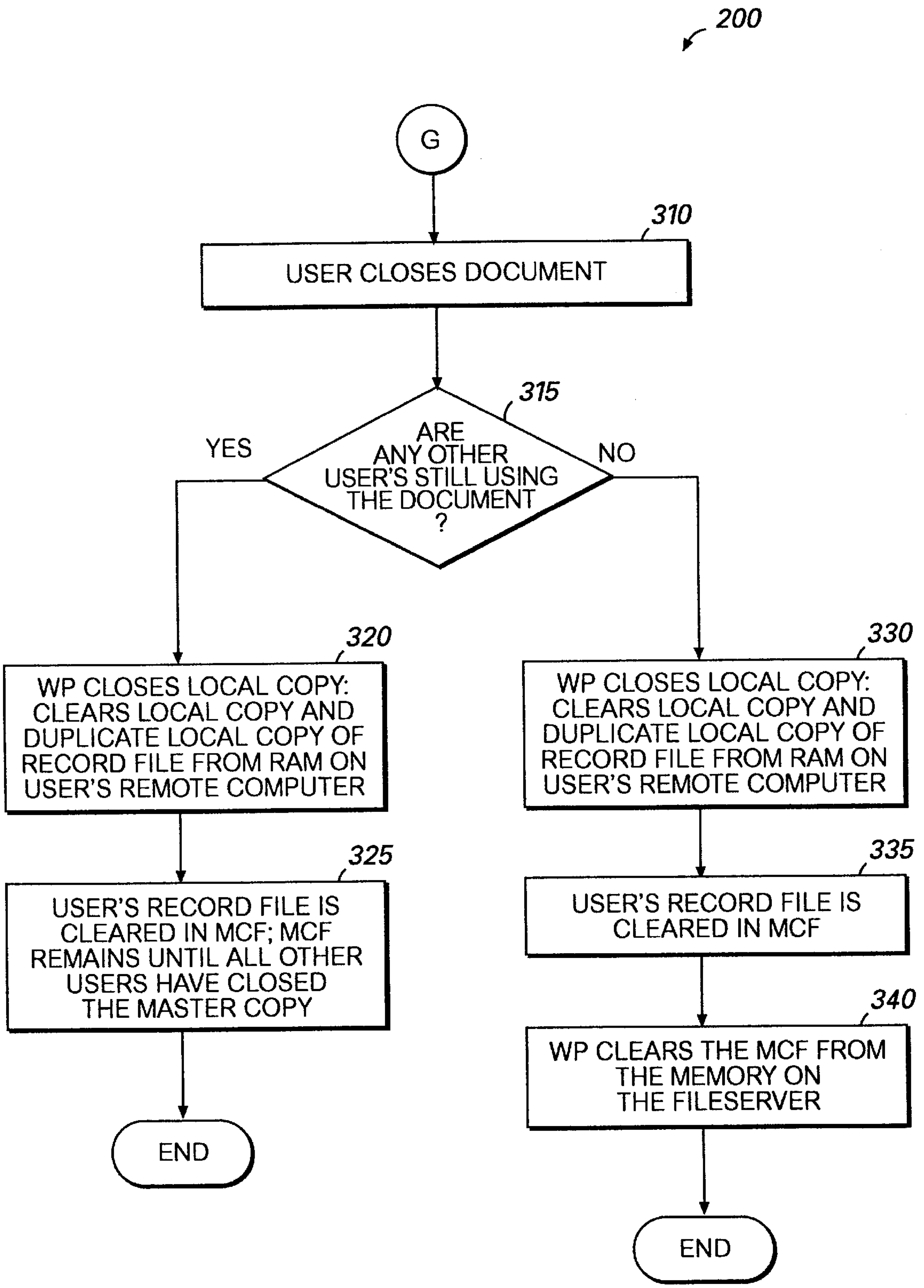
FIG. 2E, closing the local copy of the document, clearing the user’s record file within the MCF and clearing the MCF when no users are accessing the master copy of the document.

In referring to FIG. 2E, the method continues from step 310, wherein User 1 closes the file, to step 315. At step 315, the method determines whether any other users, besides User 1, are still currently using the master copy 60. Particularly at step 315, it is determined from the MCF 100 whether any other user record files, such as user record file 96 for User 2, remain thereby indicating that other users are still currently using the master copy 60. If other user record files, such as user record file 96 for User 2, still remain within the MCF 100, the method follows the "yes" branch to step 320. At step 320, the local copy 65 of the document of User 1 is cleared along with the duplicate local copy 67 of record file 86 from the resident RAM on User 1's remote computer 49. Next, as shown at step 325, User 1's respective record file 86 is cleared from the MCF 100 while the MCF 100 remains intact to handle the other remaining users, such as User 2, that are still accessing the master copy 60.

If, however, the method determines at step 315 that there are no other users still currently using the master copy 60, the method follows the "no" branch to step 330. At step 330, the local copy 65 of the document and the duplicate local copy 67 of record file 86 are cleared from the resident RAM on User 1's remote computer 49. In addition, the user record file 86 of User 1 is cleared from the MCF 100 at step 335. Finally, in the absence of any further users, the MCF 100 is cleared from the resident system memory 22 on the file server 20 at step 340.

With reference to FIG. 3, the relationships among the MCF 100, the file server 20, and the remote computers 49 of the two users as well as the structure of the MCF 100 are illustrated. When User 1 and User 2, for example, access the master copy 60 on the file server 20, the MCF 100 is created and saved on the file server 20 along with record file 66 for the master copy 60, the record file 86 for User 1, and the record file 96 for User 2. Further, it can be seen that a duplicate local copy of the master copy 60 is transferred to the respective remote computers 49 of User 1 and User 2 in the form of a local copy 65. In addition to the transfer of the local copy 65 of the document, a duplicate local copy 67 of the record files 86 and 96 are also copied to the remote computers 49 of each of the respective users, User 1 and User 2. It is further shown that each respective user is assigned it's own UVI number 72 and 74 in the MCF file 100 to facilitate version tracking as edits are made to the local copies 65 of each user and saved by User 1 and User 2.

Reconciliation Procedure

Figure 2F:
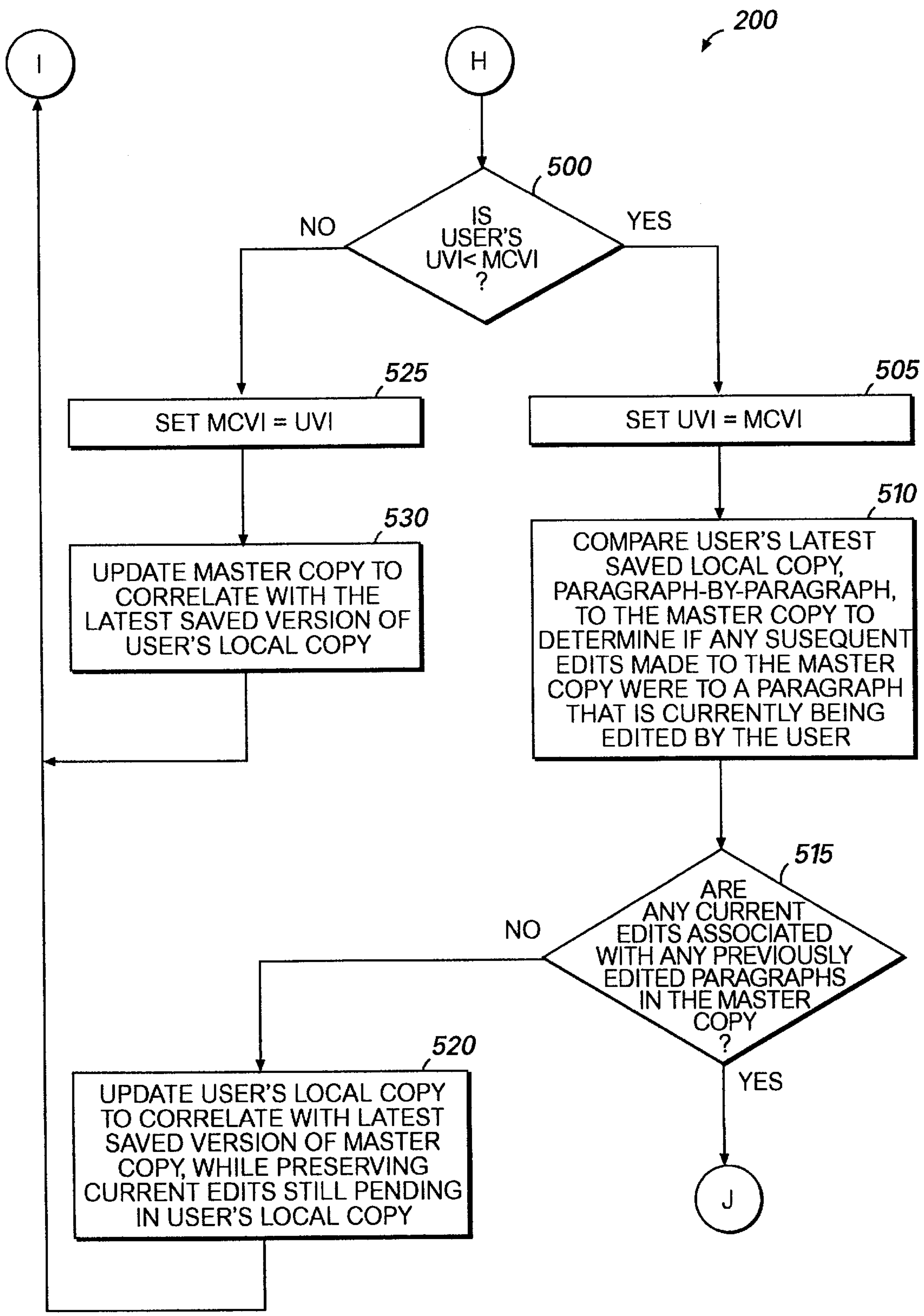
FIG. 2F, reconciling edits to the master copy of the document and determining whether conflicts exist.

In referring now to FIGS. 2C and 2F, the reconciliation method is initiated at step 280 (FIG. 2C). At step 280, the method determines whether UVI 72 of User 1 is not equal to MCVI 70. If UVI 72 of User 1 is not equal to MCVI 70, reconciliation between the master copy 60 and User 1's local copy 65 is required, and the method follows the "no" branch to step 500 in FIG. 2F.

At step 500, the method determines whether UVI 72 of User 1 is less than or greater than MCVI 70. If UVI 72 is greater than MCVI 70, the method follows the "no" branch to step 525. When UVI 72 is greater than a MCVI 70, it is possible that the system had crashed, and the MCF 100 is being reconstructed upon the restart of the system. In that circumstance, MCVI 70 is set equal to UVI 72 at step 525. At step 530, the master copy 60 is updated to correlate with the latest saved version of User 1's local copy 65.

If, however, UVI 72 for User 1 is less than MCVI 70, then the master copy 60 has been edited since User 1 initially opened the master copy 60, and the method follows the "yes" branch to step 505. At step 505, the UVI 72 is set equal to the current value of MCVI 70. Before User 1's local copy 65 can be saved, User 1's local copy 65 must first be updated from the master copy 60. At step 510, User 1's latest saved local copy 65 is compared to the master copy 60 in a paragraph-by-paragraph manner to determine if any A subsequent edits made to the master copy 60 were to a specific paragraph that was edited by the user since the last save operation. Step 510 thereby identifies whether conflicts are present with respect to any of the current edits being saved by User 1. At step 515, the method determines whether any conflicts are present. It is important to note herein that other various differing conflict criteria may be utilized to form the determination of whether a conflict is present. For the purposes of setting forth the embodiment of the present invention, a paragraph-by-paragraph analysis was utilized as in step 510.

If no conflicts are present, then the method follows the "no" branch to step 520. At step 520, User 1's local copy 65 is updated to correlate with the latest saved version of the master copy 60 while the current edits still pending in the user's local copy 65 are preserved. Once User 1's local copy 65 is correlated with the latest saved version of the master copy 60, the reconciliation is complete, and the method continues to step 290 (FIG. 2C). At step 290, the master copy 60 is overwritten by the local copy 65 with the current edits therein. From step 290, the method continues as previously described.

Figure 2G:
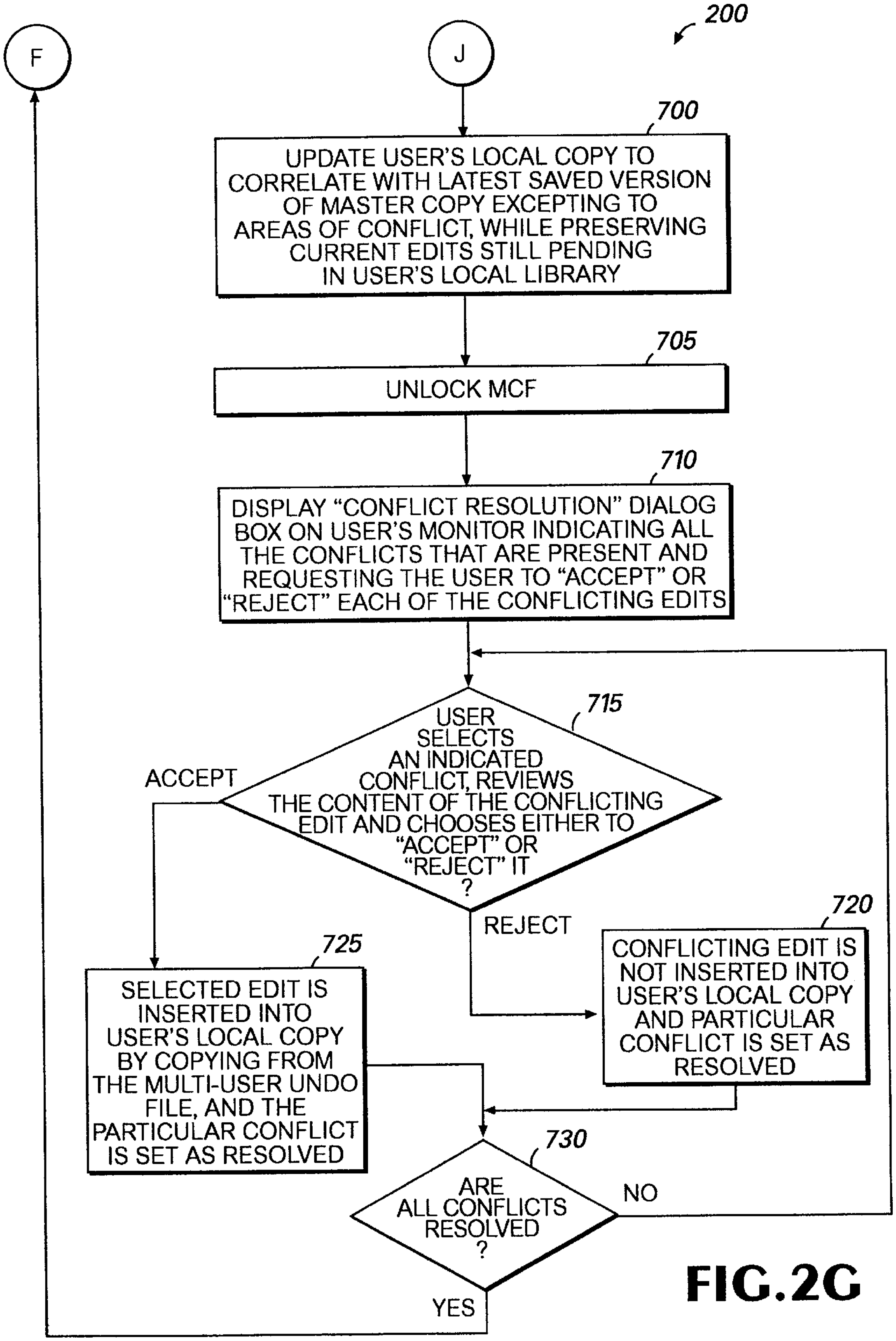
FIG. 2G, resolving conflicts among edits to the master copy of the document.

If the method determines at step 515 that there are conflicts, the method follows the "yes" branch to step 700 in FIG. 2G for conflict resolution.

In short, the determination of whether any editing conflicts are present with any of the currently pending edits of User 1 takes place before the actual reconciliation of the local copy 65 with the master copy 60. The determination of whether any conflicts are present must be undertaken prior to the actual reconciliation so that the conflict(s) can be resolved prior to updating the master copy 60.

Conflict Resolution Procedure

In referring now to FIG. 2G, the resolution of conflicts between User 1's local copy 65 and the master copy 60 begins at step 700. At step 700, the user's local copy 65 of the document is updated to correlate with the latest saved version of the master copy 60, except for those areas of the local copy 65 that conflict with the master copy 60. Next, at step 705, the MCF 100 is unlocked to allow other users, such as User 2, to access the master copy 60 and save edits thereto while User 1 resolves all the conflicts that arose during the reconciliation when User 1's requested save was attempted.

Figure 6:
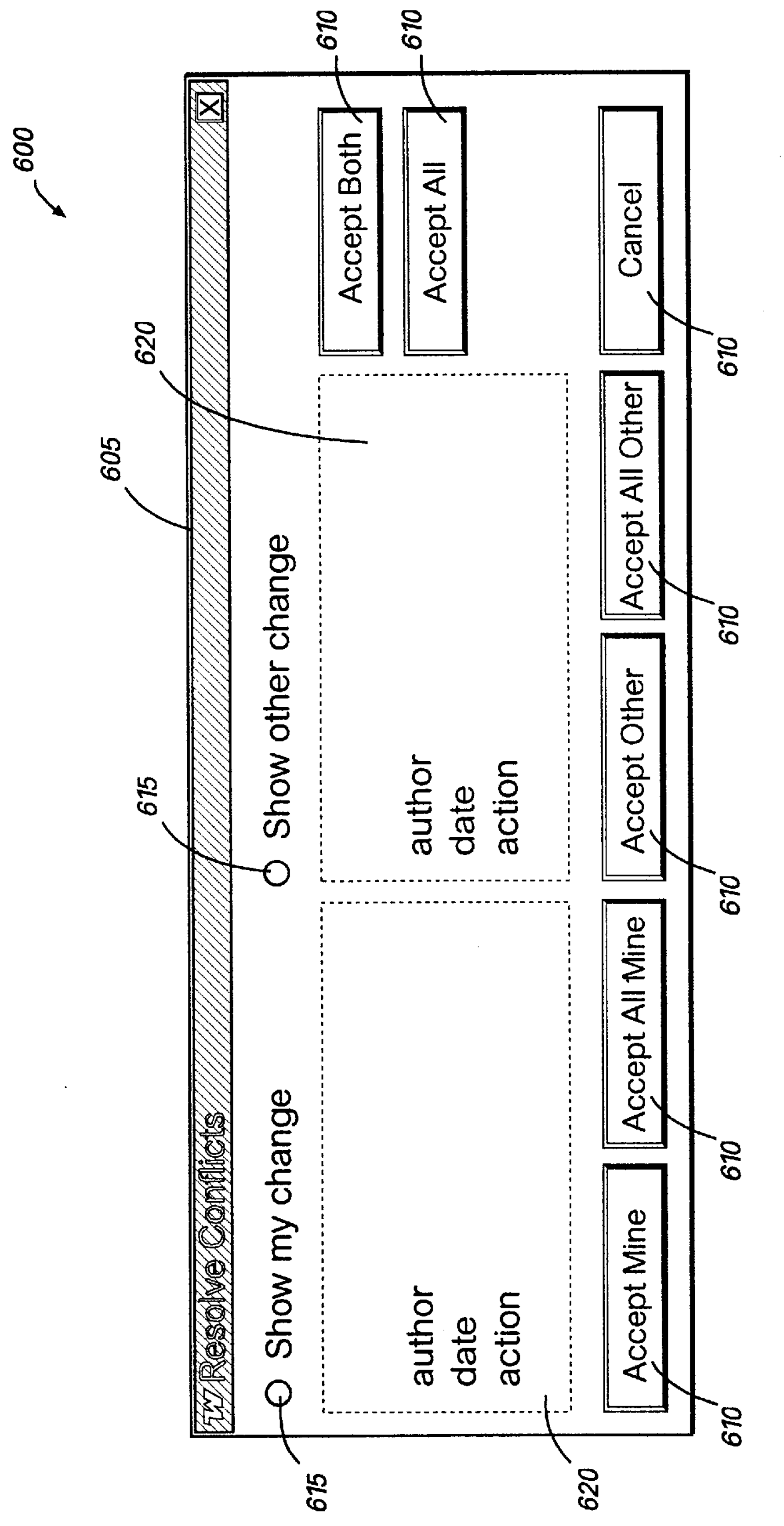
FIG. 6 is a screen display of a conflict resolution dialog box presented to a user to resolve conflicts between the edits made by a user and the changes made to the master copy since the last save attempt by the user.

At step 710, a conflict resolution dialog box 600 is displayed on the user interface screen on the monitor 80 of the remote computer 49 of User 1. The dialog box 600 displays all of the conflicts that are present and requests the user to either "accept" or "reject" each of the conflicting previous edits now existing in the master copy 60. A typical dialog box 600 is shown in FIG. 6. In FIG. 6, the dialog box 600 can be seen to include a frame 605, selection buttons 610, option boxes 615 and information windows 620. The selection buttons 610 and the option boxes 615 enable the user(s) to readily interface with the WP **36*a* (FIG. 1) and input their instructions to resolve the conflict(s). The selection buttons 610 and the option boxes 615 can all be readily engaged with a single user-interface operation, such as a single mouse click. The information windows 620 facilitate displaying information to the user pertaining to the specific edits that are in conflict. The selection buttons 610 provide the user with the following options: "Accept Mine", "Accept All Mine", "Accept Other", "Accept All Other", "Accept Both", "Accept All" or "Cancel" with respect to the conflicting edit(s). The option boxes 615** provide the user with the options of whether to show the user's edit, show the other previous edit, or show both edits that are in conflict.

Once User 1 is presented with the conflict resolution dialog box 600 on the user interface screen, User 1, at step 715 in FIG. 2G, selects the individual conflicts and resolves each one by either "accepting" or "rejecting" the conflict in one form or another by clicking the mouse on the desired selection button 610. If the user rejects the previous edit to the master copy 60 that is in conflict with the user's current pending edits, the method follows the "reject" branch to step 720. At step 720, the previous conflicting edit in the master copy 60 is not inserted into the user's local copy 65, and that particular conflict is marked as resolved. Similarly, if the user chooses to reject all the previous edits that are in conflict, all the previous edits would not be inserted into the user's local copy 65 and all the conflicts would be marked as being resolved.

If, however, at step 715, the user accepts the previous edit of the master copy 60, the method follows the "accept" branch to step 725. At step 725, the previous edit to the master copy 60 is inserted into the user's local copy 65, and that particular conflict is marked as being resolved. The previous edit to the master copy 60 is inserted into the user's local copy 65 by means of the multi-user undo file which records the various edits of the users. In a similar fashion, if the user decides to accept all the previous edits that are in conflict, all the previous edits would be inserted into the user's local copy 65, and those conflicts would be marked as being resolved.

Next, after the user has either "accepted" or "rejected" a selected conflict situation, the method from both steps 720 and 725 proceeds to step 730. At step 730, the method determines whether all of the conflicts have been resolved. If all of the conflicts have not been resolved, then the method returns to step 715, and the user selects another indicated conflicting edit. On the other hand, if all of the conflicts have been resolved, the method returns to step 260 in FIG. 2B, and the user again initiates a save. Once the user has saved again, the method repeats as previously described above.

Automatic Recovery Procedure

Figure 4:
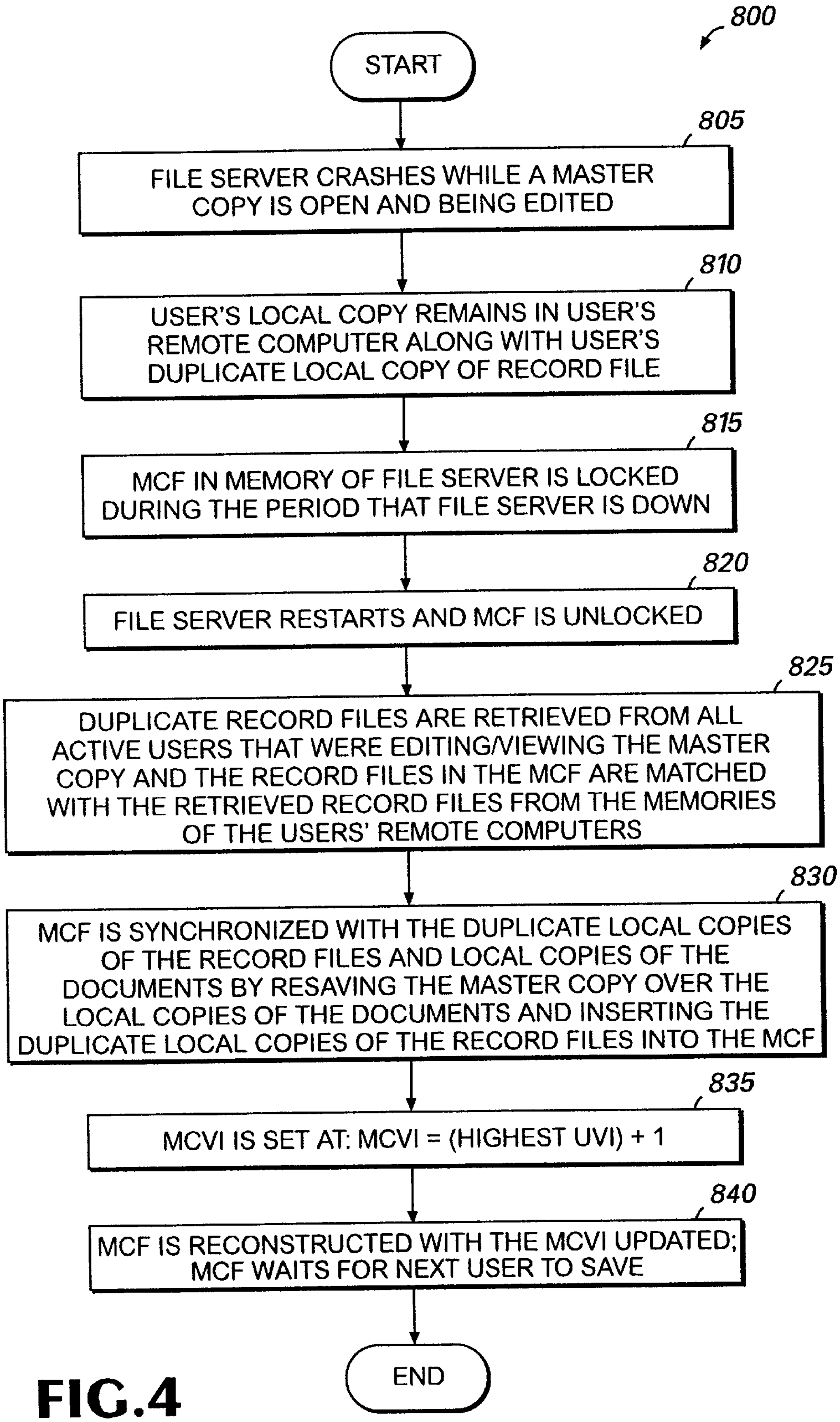
FIG. 4 is a flow diagram illustrating steps of a method for automatically recovering the multi-user editing environment from a system failure wherein the multi-user control file is reconstructed and the master copy of the document and local copies of the document are synchronized.

Referring now to FIG. 4, the flow diagram illustrates a method 800 of automatic recovery of the simultaneous, multi-user editing system should a system failure occur. The method begins at step 805 when the file server 20 is powered down or inadvertently becomes disconnected due to a system failure while a master copy 60 is open and being edited. In order to recover and reconstruct the MCF 100 and the master copy 60, the method proceeds to step 810. At step 810, the local copies 65 of the documents for each user remain in the memory of each respective user's remote computer 49 along with the duplicate local copies 67 of each user's respective record files, 86 and 96 in the case of User 1 and User 2. At step 815, the MCF 100, which is saved in the resident system memory 22 of the file server 20, is locked during the period that the system is down. As soon as the file server 20 restarts, the MCF 100 is unlocked at step 820. After the MCF 100 is unlocked at step 825, all the active users that were editing the master copy 60 when the system crashed are identified. The active users are identified by matching the respective user record files 86 and 96 within the MCF 100 with the duplicate local copies 67 located in the resident memories of the users'respective remote computers 49.

At step 830, the MCF 100 is synchronized with the local copies 67 of the record files 86 and 96 and the local copies 65 of the documents by resaving the master copy 60 over the local copies 65 and inserting the duplicate local copies 67 of the record files 86 and 96 into the MCF 100. At this point, MCVI 70 is set equal to highest UVI+1 (the value of UVI 72 or UVI 74 incremented by 1), at step 835. The value of MCVI 70 is set to such incremented value for the purpose of forcing a reconciliation upon the next attempted save by each of the users. Finally, at step 840, after updating the MCVI 70 in accordance with step 835, the MCF 100 waits for the next user to save.

In short, the MCF 100 is reconstructed at start up after a system failure by recognizing the users that were on-line at the time of the crash and matching the duplicate local copies 67 of the record files 86 and 96 in the resident memory of the remote computers 49. The MCF 100 then synchronizes the master copy 60 with the local copies 65.

Manual Removal of a User

Figure 5:
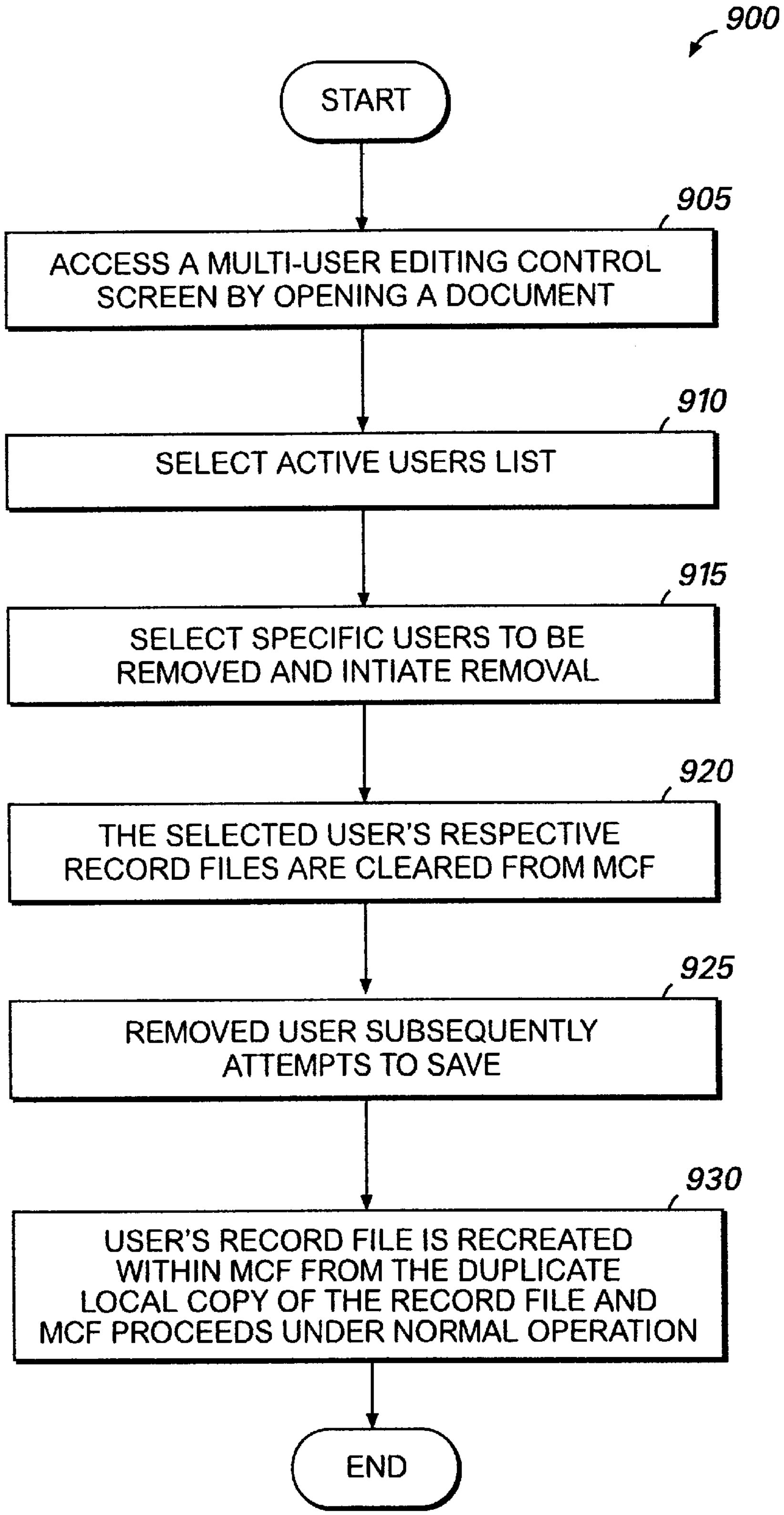
FIG. 5 is a flow diagram illustrating steps of a method for the manual removal of users from the multi-user editing environment.

Referring to FIG. 5, the flow diagram illustrates a method 900 for manually removing a user should a user inadvertently finish editing the master copy 60 and forget to close the master copy 60. As illustrated at step 905, a multi-user editing control screen 950 is accessed by opening a document (see FIG. 7A).

Figure 7A:
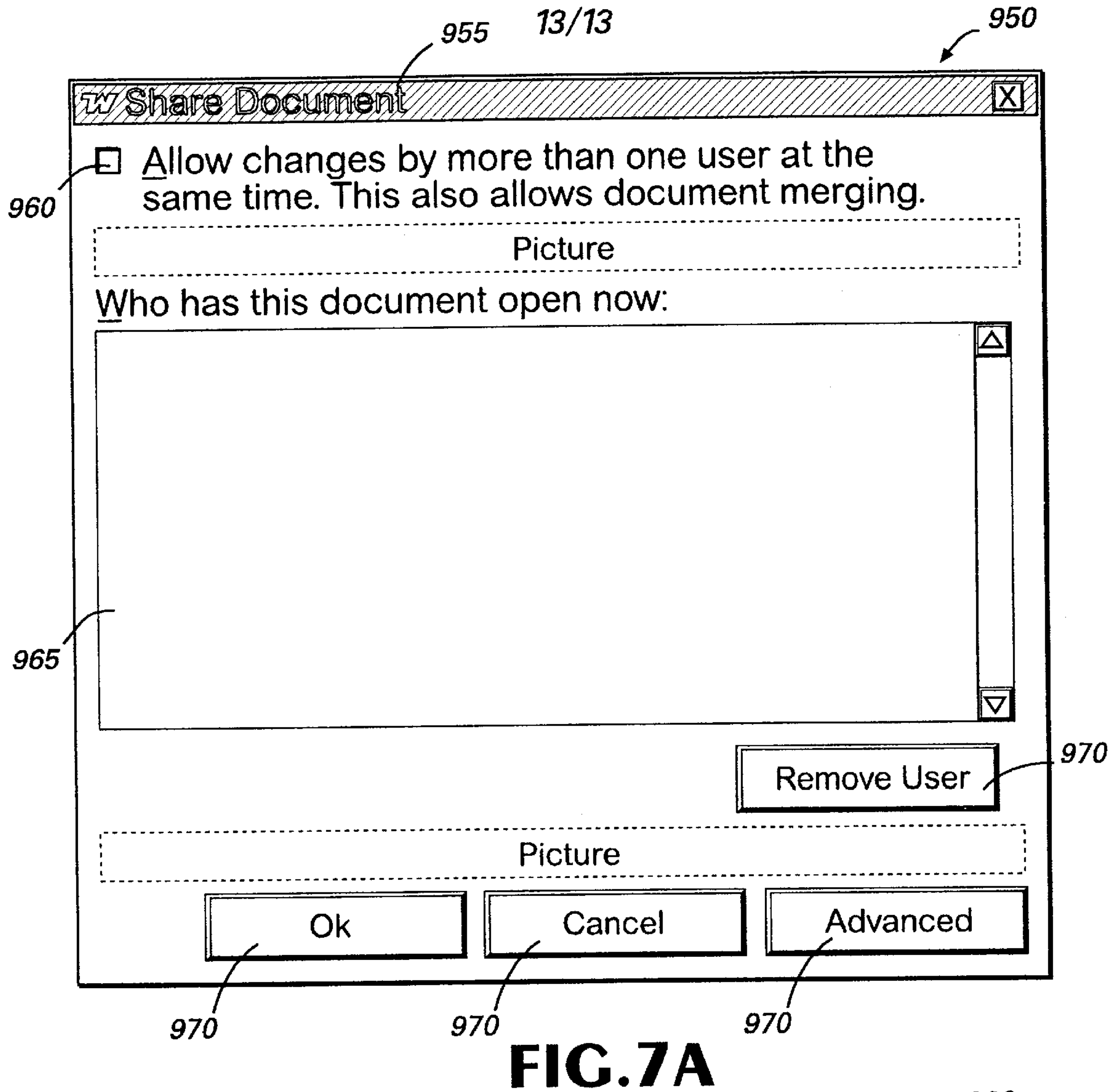
FIGS. 7A and 7B are screen displays for the multi-user editing control screen and the advanced option dialog box respectively that are used in connection with the manual removal of users from the simultaneous, multi-user editing system of the present invention.

In FIG. 7A, the multi-user editing control screen 950 can be seen to include a frame 955, an option box 960, a user window 965 and selection buttons 970. The selection buttons 970 and the option box 960 enable the user to readily interface with the WP 36*a* (FIG. 1) and input instructions to remove the desired user(s). The selection buttons 970 and the option box 960 can all be readily engaged with a single user-interface operation, such as a single mouse click. The user window 965 facilitates displaying to the user the active user list. The selection buttons 970 include: "Remove User", "OK", "Cancel" and "Advanced". The option box 960 provides the user with the option to allow changes by more than one user, thereby allowing multi-user editing.

In continuing from step 905, the active user(s) list is displayed in the user window 965 at step 910. Once the active users list is viewed and the specific user(s) to be removed is/are selected, the removal process is initiated at step 915. At step 915 the individual user(s) are selected and highlighted by simply pointing the mouse on the specific name(s) of the user(s) and clicking once. After selecting the specific names of the user(s) to be removed, the "Remove User" selection button 970 is chosen with the mouse and clicked on once. After the specific users are selected and the manual removal is initiated, the respective record files, such as user record files 86 and 96, of the selected users are cleared from the MCF 100. Clearing the user record files from the MCF 100, for example 86 and 96, signifies to the WP 36*a* that users without record files in the MCF 100 are no longer accessing the master copy 60. Once the user record files have been cleared, the MCF 100 can be cleared once the last active user closes out of the master copy 60.

Additionally, from the multi-user editing control screen 950, the "Advanced" selection button 970 may be chosen by the user to further provide the user with more multi-user editing options. Should the user choose the "Advanced" options, the advanced option dialog box 980 (see FIG. 7B) will be displayed on the monitor 80 of the user's remote computer 49.

Figure 7B:
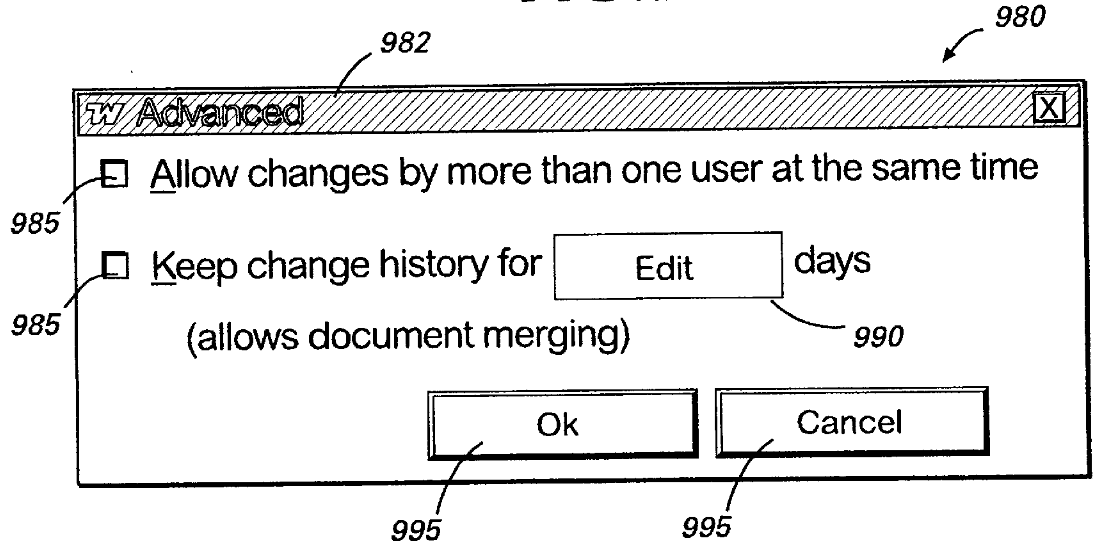

As can be seen in FIG. 7B, the advanced option dialog box 980 includes a frame 982, option boxes 985, an entry window 990 and selection buttons 995. The option boxes 985 in the advance option dialog box 980 provide the user with the options to "allow changes by more than one user at the same time" and/or "to keep the change history for a specified amount of days." The specific amount of days for which the change history is to be stored is input by the user by entering the number of days into the entry window 990. The selection buttons 995 are comprised of: "OK" and "Cancel". Once the desired option boxes 985 are chosen, the user confirms the choices by engaging the "OK" selection button 995.

It is important to note, however, that the user(s) that was/were manually removed will still have a local copy 65 of the document and a local copy 67 of the record file in the resident memory of the user's respective remote computer 49. Hence, the manually removed user(s) can still attempt to save edits made to the local copy 65 of the document. Should the user(s) attempt to save any edits, as illustrated at step 925, the user(s) record file(s) will be recreated in the MCF 100 by inserting the duplicate local copy 67 of the record file located in the resident memory of the user's respective remote computer 49 as illustrated at step 930. Once the appropriate duplicate local copy 67 of the record file(s) for the respective user(s) has/have been inserted into the MCF 100, the MCF 100 proceeds with normal operation.

SUMMARY OF THE DETAILED DESCRIPTION

From the foregoing description, it will be appreciated that the present invention provides a system for the simultaneous, multi-user editing of a document stored on a shared disk. In an embodiment of the present invention, a plurality of users can access a master copy 60 stored in system memory 22 of the file server 20, make various edits thereto, and save the edits over the master copy 60 thereby maintaining an updated master copy 60 that reflects the latest edits saved by the plurality of users.

The simultaneous, multi-user editing of the present invention incorporates the use of the multi-user control file 100 (MCF) having individual record files 66, 86, and 96 associated with the master copy 60 and with each user that is accessing the master copy 60. The MCF 100 facilitates the control of the timing of the saving actions and the tracking of the various versions of local copies 65. The word processing program module **36*a* (WP) of the present invention provides for the reconciling of the master copy 60 with the local copies 65, as well as detection and resolution of conflicts that may arise during the reconciliation procedure. During the reconciliation procedure, the Wp 36*a* locks the MCF 100 to prevent any other user from accessing and saving to the master copy 60**.

In another aspect of the present invention, relating to the resolution of conflicts, a "Conflict Dialog Box" displays the individual conflicts to the user and requires the user to either "accept" or "reject" each conflict until all the conflicts have been resolved before the edits to the master copy 60 are saved. During the conflict resolution procedure, the WP **36*a* unlocks the MCF 100 to once again allow other users to access and save edits to the master copy 60**.

In yet another aspect of the present invention, the word processing program module **36*a* can automatically recover from a system failure by reconstructing the MCF 100 from the duplicate local record files 67 and synchronizing the master copy 60 with the local copies 65 of each user. The reconstructing of the MCF 100 is accomplished by matching the user record files, for example 86 and 96, located in the MCF 100 to the users' local copies 67 located on the remote computers 49** of the respective users.

In yet another aspect of the present invention, the word processing module **36*a* provides for the manual removal of a user from the MCF 100. The capability to manually remove a user is necessary to clean up the MCF 100 when a user leaves a remote computer 49 without closing the local copy 65 of the document that was being edited. Therefore, when the last user has closed their respective local copy 65 of the document, the MCF 100 is cleared from the file server 20**.

The foregoing system may be conveniently implemented in a program module that is based upon the flow charts in FIGS. 2A–G and 4–5 as well as the illustrations in FIGS. 3, 6, 7A and 7B. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of creating a multi-user control file to be associated with the master copy document, creating a local copy document for the user to edit, assigning version identifier numbers to the documents, tracking the version identifiers and coordinating the various saving actions by the users so as to facilitate maintaining an updated master copy document that reflects the latest edits saved by a user. However, those skilled in the art will understand that the principles of the present invention apply to any tasks or processes that require simultaneous multi-user access to a document or file for multi-user use.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for simultaneous, multi-user editing of a document stored in a memory shared by a plurality of users, comprising the steps of:

a. creating a multi-user control file in the shared memory that is associated with a master copy of the document when a first user of the plurality of users accesses the document in the shared memory from a local computer;

b. assigning the master copy of the document a master copy version identifier number when the first user of the plurality of users accesses the document in the shared memory;

c. creating a local copy of the document for editing by each user on each user's local computer, which first local copy duplicates the master copy, when each user of the plurality of users accesses the document in the shared memory;

d. assigning each local copy of the document a unique user version identifier number when each user of the plurality of users accesses the document in the shared memory;

e. initiating a save operation by one user of the plurality of users;

f. when the one user of the plurality of users saves any edits made to the document, comparing the user version identifier number for that one user to the master copy version identifier number; and g. based on that comparison, reconciling the master copy and the one user's local copy of the document by determining whether any conflicts exist between the master copy and the one user's local copy, presenting those conflicts to the one user, and resolving those conflicts based on input from the user.

2. The computer-implemented method of claim 1, wherein the method further comprises the step of updating the master copy version identifier number and the one user's user version identifier number after the reconciliation step.

3. The computer-implemented method of claim 1, wherein during the reconciliation step, the users other than the one user involved in the reconciliation step are denied access to the master copy and the multi-user control file.

4. The computer-implemented method of claim 1, wherein the method further comprises the step of creating a record file within the multi-user control file for the master copy and for each user accessing the master copy wherein the user record files include the unique user version identifier numbers and the name of the user, creating a duplicate local copy of each user record file on each user's respective local computer, and updating the one user's record file as part of the reconciliation step.

5. The computer-implemented method of claim 4, wherein the method further comprises the step of recovering from a failure of the shared memory comprising the steps of:

a. restarting the shared memory; and b. recreating the multi-user control file from the duplicative local copies of the record files on each user's local computer.

6. The computer-implemented method of claim 4, wherein the method further includes the step for manually removing a user from the multi-user control file comprising the steps of:

a. accessing a multi-user editing control screen;

b. selecting an active users list;

c. selecting specific users to be removed; and d. causing the multi-user control file to clear the respective record files of the users.

7. The computer-implemented method of claim 1, wherein the reconciliation step comprises saving the master copy over the one user's edited local copy after all conflicts are resolved while preserving the edits in the one user's edited local copy.

8. The computer-implemented method of claim 7, wherein the step of reconciling further comprises the steps of saving the one user's edited local copy having the preserved edits over the master copy, incrementally increasing the master copy version identifier number, and setting the one user's user version identifier number equal to the master copy version identifier number as the edits of the one user are saved.

9. A computer-readable medium on which is stored a computer program for simultaneous, multi-user editing of a document stored in a memory shared by a plurality of users, the computer program comprising instructions which, when executed by a computer, perform the steps of:

a. creating a multi-user control file in the shared memory that is associated with a master copy of the document when a first user of the plurality of users accesses the document in the shared memory from a local computer;

b. assigning the master copy of the document a master copy version identifier number when the first user of the plurality of users accesses the document in the shared memory;

c. creating a local copy of the document for editing by each user on each user's local computer, which first local copy duplicates the master copy, when each user of the plurality of users accesses the document in the shared memory;

d. assigning each local copy of the document a unique user version identifier number when each user of the plurality of users accesses the document in the shared memory;

e. initiating a save operation by one user of the plurality of users;

f. when the one user of the plurality of users saves any edits made to the document, comparing the user version identifier number for that one user to the master copy version identifier number; and g. based on that comparison, reconcling the master copy and the one user's local copy of the document by determining whether any conflicts exist between the master copy and the local copy being saved by the one user, presenting those conflicts to the one user, and resolving those conflicts based on input from the one user.

10. The computer-readable medium of claim 9, wherein the program further performs the step of updating the master copy version identifier number and the one user's user version identifier number after the reconciliation step.

11. The computer-readable medium of claim 9, wherein during the reconciliation step, the users other than the one user involved in the reconciliation step are denied access to the master copy and the multi-user control file.

12. The computer-readable medium of claim 9, wherein the program further performs the step of creating a record file within the multi-user control file for the master copy and for each user accessing the master copy wherein the user record files include the unique user version identifier numbers and the name of the user, creating a duplicate copy of each user record file on each user's respective local computer, and updating the one user's record file as part of the reconciliation step.

13. The computer-readable medium of claim 12, wherein the program further performs the step of recovering from a failure of the shared memory comprising the steps of:

a. restarting the shared memory; and b. recreating the multi-user control file from the duplicative local record files on each user's local computer.

14. The computer-readable medium of claim 12, wherein program further performs the step for manually removing a user from the multi-user control file comprising the steps of:

a. accessing a multi-user editing control screen;

b. selecting an active users list;

c. selecting specific users to be removed; and d. causing the multi-user control file to clear the respective record files of the users.

15. The computer-readable medium of claim 9, wherein the reconciliation step comprises saving the master copy over the one user's edited local copy after all conflicts are resolved while preserving the edits in the one user's edited local copy.

16. The computer-readable medium of claim 15, wherein the step of reconciling further comprises the steps of saving the one user's edited local copy having the preserved edits over the master copy, incrementally increasing the master copy version identifier number, and setting the one user's user version identifier number equal to the master copy version identifier number as the edits of the one user are saved.

17. A networked computer system for accessing and editing a master copy of a document stored in a shared memory, the document capable of being accessed and edited by a plurality of users simultaneously, comprising:

a. a file server having a server processing unit;

b. a shared memory storage device coupled to the server processing unit;

c. a network bus coupled to the server processing unit;

d. at least one local computer having a local processor coupled to the network bus;

e. an input device coupled to the local processor;

f. a pixel-based display device coupled to the local processor;

g. a local memory storage device coupled to the local processor; and h. the local processor being operative to:

i. creating a multi-user control file in the shared memory that is associated with a master copy of the document when a first user of the plurality of users accesses the document in the shared memory from a local computer;

ii. assigning the master copy of the document a master copy version identifier number when the first user of the plurality of users accesses the document in the shared memory;

iii. creating a local copy of the document for editing by the user on the user's local computer, which first local copy duplicates the master copy, when the user accesses the document in the shared memory;

iv. assigning the local copy of the document a user version identifier number when the user accesses the document in the shared memory;

V. initiating a save operation by the user;

vi. when the user saves any edits made to the document, comparing the user version identifier number for that user to the master copy version identifier number; and vii. based on that comparison, reconciling the master copy and the user's local copy of the document by determining whether any conflicts exist between the master copy and the local copy being saved by the user, presenting any of said conflicts to the one user, and resolving those conflicts based on input from the user.

18. The networked computer system of claim 17, wherein the local processor further performs the step of updating the master copy version identifier number and the user's user version identifier number after the reconciliation step.

19. The networked computer system of claim 17, wherein during the reconciliation step, users other than the user involved in the reconciliation step are denied access to the master copy and the multi-user control file.

20. The networked computer system of claim 17, wherein the local processor further performs the step of creating a record file within the multi-user control file for the master copy and for the user accessing the master copy wherein the user record files include the user version identifier number and the name of the user, creating a duplicate local copy of the user record file on the user's respective local computer, and updating the user's record file as part of the reconciliation step.

21. The networked computer system of claim 20, wherein the local processor further performs the step of recovering from a failure of the shared memory comprising the steps of:

a. locating the multi-user control file in the shared memory after the shared memory is restarted; and b. recreating the multi-user control file from the duplicative local copy of the record file on the user's local computer.

22. The networked computer system of claim 20, wherein local processor further performs the step for manually removing a user from the multi-user control file comprising the steps of:

a. accessing a multi-user editing control screen;

b. selecting an active users list;

c. selecting specific users to be removed; and d. causing the multi-user control file to clear the respective record file of the user.

23. The networked computer system of claim 17, wherein the reconciliation step comprises saving the master copy over the user's edited local copy after all conflicts are resolved while preserving the edits in the user's edited local copy.

24. The networked computer system of claim 23, wherein the step of reconciling further comprises the steps of saving the user's edited local copy having the preserved edits over the master copy, incrementally increasing the master copy version identifier number, and setting the user's user version identifier number equal to the master copy version identifier number as the edits of the user are saved.

* * * * *